(No Model.) 2 Sheets—Sheet 1.

F. BAGLEY.
WINDMILL.

No. 580,302. Patented Apr. 6, 1897.

Attest:
J. F. Groat
F. J. Kubicek

Inventor:
Frank Bagley
By J. McS. John,
Atty.

THE NORRIS PETERS CO., PHOTO-LITHO., WASHINGTON, D. C.

(No Model.) 2 Sheets—Sheet 2.

F. BAGLEY.
WINDMILL.

No. 580,302. Patented Apr. 6, 1897.

Attest,
J. F. Gwet.
F. J. Kubíček.

Inventor
Frank Bagley
By J. M. St. John
Atty.

THE NORRIS PETERS CO., PHOTO-LITHO., WASHINGTON, D. C.

UNITED STATES PATENT OFFICE.

FRANK BAGLEY, OF OMAHA, NEBRASKA, ASSIGNOR OF ONE-HALF TO ROBERT TEMPLETON, OF SAME PLACE.

WINDMILL.

SPECIFICATION forming part of Letters Patent No. 580,302, dated April 6, 1897.

Application filed December 11, 1896. Serial No. 615,345. (No model.)

*To all whom it may concern:*

Be it known that I, FRANK BAGLEY, a citizen of the United States, residing at Omaha, in the county of Douglass and State of Nebraska, have invented certain new and useful Improvements in Windmills; and I do hereby declare the following to be a full, clear, and exact description of the invention, such as will enable others skilled in the art to which it appertains to make and use the same.

This invention relates to duplex windmills; and the object of the invention is to greatly increase the efficiency of windmills of this type by a construction which admits of either wind-wheel turning independently of the other.

The invention also embraces other improvements relating more especially to details of construction, all of which will more fully hereinafter appear.

Figure 1:
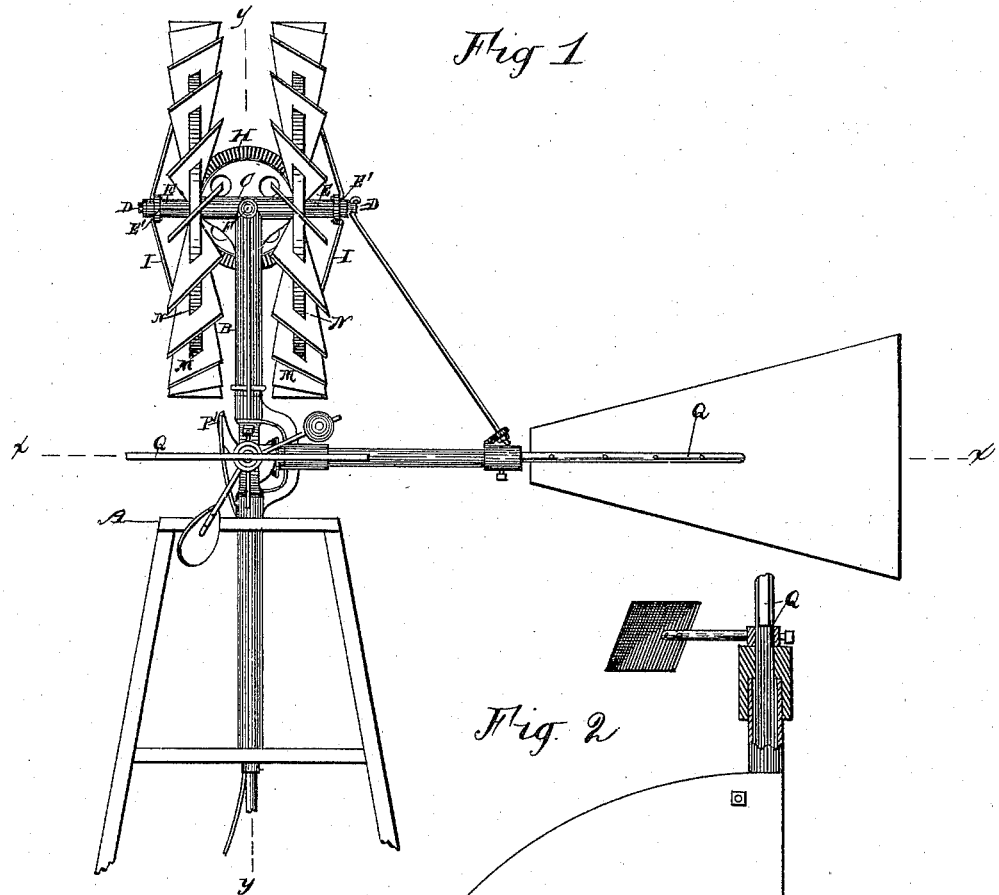
Figure 2:
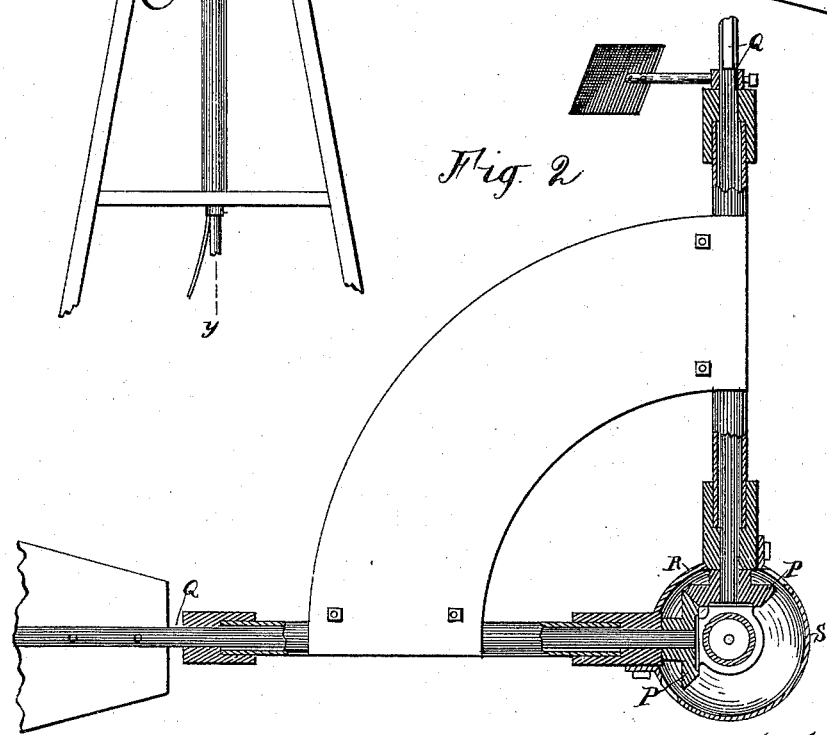
Figure 4:
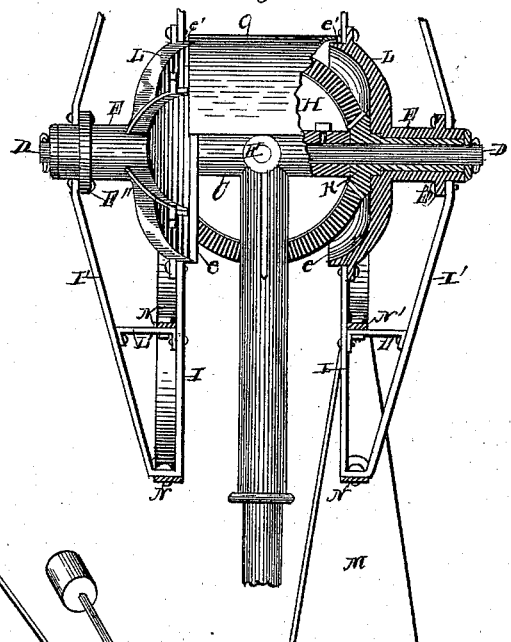
Figure 3:
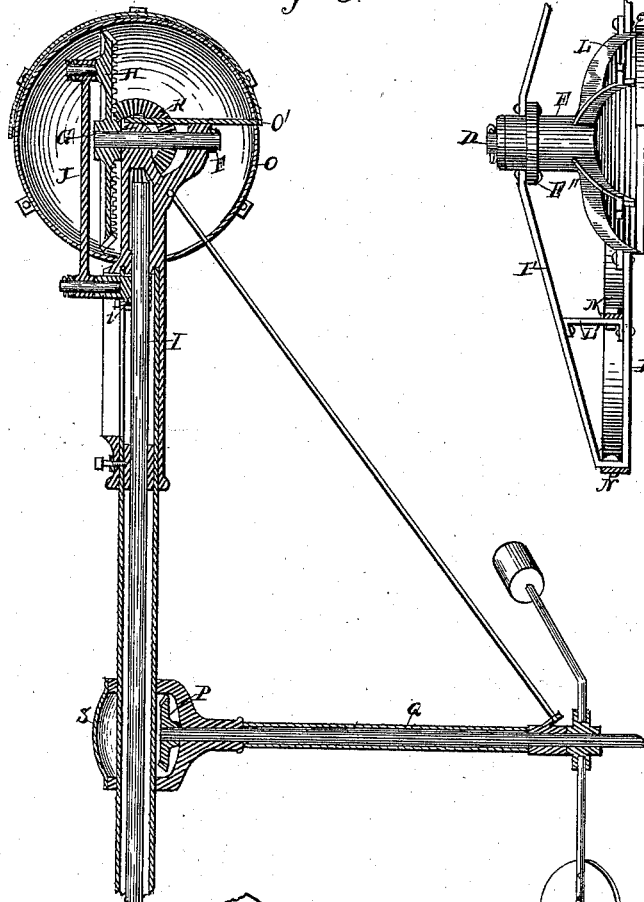
Figure 6:
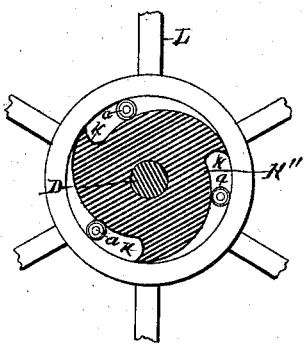
Figure 5:
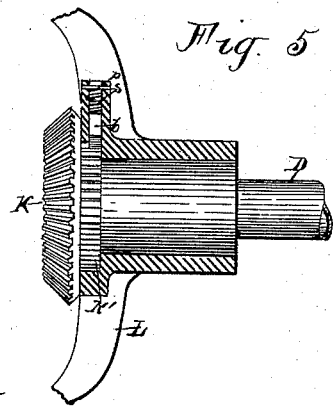

In the accompanying drawings, forming a part of this specification, Figure 1 is a side elevation of a windmill embodying my invention. Fig. 2 is a fragmentary plan view, partly sectional, on the line $x\ x$ of Fig. 1, showing the construction and arrangement of the vane-arms and their supports. Fig. 3, Sheet 2, is a central vertical section in the line $y\ y$ of Fig. 1, looking from the left of said figure. Fig. 4 is a fragmentary side elevation showing the construction of the masthead, wind-wheel spiders, and connected parts. Fig. 5 is a fragmentary view, partly sectional, showing the manner of mounting the wind-wheels. Fig. 6 is a fragmentary plan view of one of the wind-wheel spiders, showing a modification in the construction of the clutch therefor.

Similar letters of reference indicate corresponding parts.

The improvements which form the subject-matter of this application relate more particularly to the windmill described in the application of Henry Bagley for Letters Patent, Serial No. 600,328, filed July 24, 1896. The construction in the main being similar thereto, a detailed description of the windmill will be unnecessary, except as to the features claimed as novel herein.

In watching and testing the operation of windmills of this type I have discovered the source of a difficulty peculiar to the duplex windmill. In a steady wind such a windmill runs very nicely, but if the wind is fitful and gusty there is in the case of the mill as ordinarily made a considerable amount of wrenching on the gearing and shaking of the tower, amounting at times to the destruction of gear-teeth and more or less straining of the whole apparatus. This is due to the rigid connection of the two wind-wheels, they being geared directly together. Such being the case, when a sudden gust strikes the windward wheel it must overcome the inertia of the other before the wind can act upon it, and this produces a more or less violent strain on the mechanism, impairing the efficiency of the windmill and causing undue wear and breakage. To remedy this difficulty, I mount the wind-wheels and connect them independently of each other with the gearing transmitting movement to the pump-rod or other apparatus. This forms the principal feature of this invention and will be fully described hereinafter.

Referring now to the drawings, A designates the top of a windmill-tower on which is revolubly mounted the mast B of the windmill. This has a T-shaped head C, in the equilateral arms of which are secured suitable studs D D to support the spiders E E of the wind-wheels. Through the middle of the head, at right angles to the studs, passes a shaft F, journaled also in a lateral bearing G, as shown in Fig. 3. To one end of this shaft is secured a bevel-gear H, which transmits reciprocating motion to the pump-rod through the medium of a connecting-rod J, coupled to a wrist-pin $h$ on the back side of the gear, and a cross-head $i$, secured to the guide-rod I, supposed to connect with the pump-rod. (Not shown.) This improvement in the construction of the masthead admits of the gear H being brought close to the center of the mast and provided with a short hub. This in turn permits the use of a straight connecting-rod J running much closer to the center of the mast at its connection with the wrist on the gear than would be possible with a long hub on said gear. The advantage is of course to give a more direct thrust on the guide-rod I and prevent the vibration incident to the use of offset connections. At the same time a much longer and steadier, as well as more durable, bearing is given to the wrist-gear than would be possible without a very long hub running on a fixed stud. As this gear takes all the strain of the work performed by the windmill, the importance of this improvement will be evident.

Motion is imparted to the wrist-gear by a pair of pinions K K, driven by the wind-wheels. These pinions are provided with long hubs turning freely on the studs D D. The hubs at the same time form the bearings for the spiders E E, which are made to turn thereon, and may do so freely in one direction. In the other direction they are made to engage with the pinions by a suitable ratchet or clutch. This is illustrated in two forms, one shown in Fig. 5 and the other in Fig. 6. In the former the pinion hub or sleeve is provided with a ratchet at K'. In an extension E' of the spider-hub is mounted a bevel-ended bolt or pawl b, pressed into engagement with the ratchet by a spring s, held in place by a suitable pin p. In the preferred form shown in Fig. 6 the enlargement of the sleeve K'' is made cam-shaped, and between its cams k k k and the annular hub of the spider, within which it turns, are placed suitable balls a a a. The effect of this construction is to impart positive motion to the pinions and connected mechanism whether either one or both of the wind-wheels is revolving. At the same time it admits of one wheel lagging a little at times, as it will naturally do when the wind comes in puffs or sudden gusts. The windward wheel does not, therefore, have to overcome the inertia of the other wheel as well as perform the work of the mill at such times, as it does when both wheels are positively geared together, and the injurious and wasteful effect of such energy is entirely prevented.

To give the greatest efficiency to the wind-wheels, they should run as closely together as possible. To some extent this may be determined by the size of the wrist-gear, but the hubs of the spiders cannot approach very near each other on account of the lateral arms of the masthead, which support the studs D D. The desired result is secured, however, by dishing the spiders, as clearly shown in Fig. 4, so that the outer ends of its arms somewhat overhang the gear. To the ends of these arms are bolted the shorter arms l of the spokes L L. The outer and longer arms l' l' are secured to a flange E'' near the outer end of the spider-hub. The outer end of the spoke is bent at right angles to the inner arm l, and to it is suitably secured the outer ring or rim N, to which the wheel-vanes M M are secured. The inner ends of such vanes are attached to another ring N', which is fastened to a cross-bar L', connecting the two arms of the spoke near the middle.

A further improvement in the spider consists in connecting the spokes with a continuous concave web e, provided with an annular flange e', extending over the gear H. Over this flange, but out of contact with it, is mounted a semicircular hood O, the sides of which project over the flanges e' e'. This hood is attached to some suitable part of the masthead, as to the central part, by an inwardly-extending base plate or bracket O', as shown in Fig. 3. This construction and arrangement of the parts is such as to protect the gearing from rain and sleet and thus prevent the mill being rendered useless by freezing. Provision is also made for protecting the miter-gears P P, which rotate the vane-shafts Q Q', from the elements. The yoke R, which forms the inner bearing for said shafts, is connected on the inner side by a continuous web. Outside the gears is attached a semicircular cap S, which is suitably slotted to allow the tailpiece P' to pass through. The yoke is shown without the cap in Fig. 1, with a cord or wire connected to the tail P', by which the mill is thrown out of the wind from the ground.

Having thus described my invention, what I claim as new, and desire to secure by Letters Patent, is—

1. In a windmill, the combination with a suitable masthead, of a pair of pinions, an intermediate gear, a pair of wind-wheels revolving in parallel planes, and a clutch connection of each wheel with its corresponding pinion, substantially as and for the purpose set forth.

2. In a windmill, the combination with a suitable masthead, of a wind-wheel mounted revolubly thereon, a pinion connected therewith, an intermediate gear engaging said pinion and another opposite thereto, and another wind-wheel having a clutch connection with said last-mentioned pinion adapted to impart positive motion to it in a direction contrary to that of the first-named pinion, but to revolve in the other direction free of said pinion, whereby said wind-wheels may revolve independently of each other, as described.

In testimony whereof I affix my signature in presence of two witnesses.

FRANK BAGLEY.

Witnesses:
 ROBT. TEMPLETON,
 C. H. WARE.